US010194375B2

(12) United States Patent
Calcev et al.

(10) Patent No.: US 10,194,375 B2
(45) Date of Patent: Jan. 29, 2019

(54) SYSTEM AND METHOD FOR CONTROLLING NETWORK SIGNALING LOADS IN A WIRELESS NETWORK

(71) Applicant: Futurewei Technologies, Inc., Plano, TX (US)

(72) Inventors: George Calcev, Hoffman Estates, IL (US); Lin Cai, Hoffman Estates, IL (US); Hanan J. Ahmed, Belleville, MI (US)

(73) Assignee: Futurewei Technologies, Inc., Plano, TX (US)

( * ) Notice: Subject to any disclaimer, the term of this patent is extended or adjusted under 35 U.S.C. 154(b) by 688 days.

(21) Appl. No.: 14/673,359

(22) Filed: Mar. 30, 2015

(65) Prior Publication Data

US 2016/0295497 A1    Oct. 6, 2016

(51) Int. Cl.
*H04W 48/06* (2009.01)
*H04L 12/26* (2006.01)
*H04W 28/08* (2009.01)
*H04W 28/02* (2009.01)

(52) U.S. Cl.
CPC ......... *H04W 48/06* (2013.01); *H04L 43/0882* (2013.01); *H04L 43/10* (2013.01); *H04W 28/08* (2013.01); *H04L 43/16* (2013.01); *H04W 28/0284* (2013.01)

(58) Field of Classification Search
CPC ..... H04L 43/0882; H04L 43/10; H04L 43/16; H04W 48/06; H04W 28/08; H04W 28/0284
See application file for complete search history.

(56) References Cited

U.S. PATENT DOCUMENTS

| 7,583,978 B2* | 9/2009 | Miyajima | H04W 36/32 370/331 |
| 9,247,459 B2* | 1/2016 | Liu | H04W 28/16 |
| 2008/0117875 A1* | 5/2008 | Bennett | H04W 36/32 370/331 |
| 2008/0170497 A1* | 7/2008 | Jeong | H04W 28/08 370/230 |
| 2009/0265543 A1* | 10/2009 | Khetawat | H04W 12/08 713/151 |

(Continued)

FOREIGN PATENT DOCUMENTS

| CN | 101741438 A | 6/2010 |
| CN | 103378920 A | 10/2013 |

(Continued)

*Primary Examiner* — Edan Orgad
*Assistant Examiner* — Nourali Mansoury
(74) *Attorney, Agent, or Firm* — David William Roe

(57) ABSTRACT

Network signaling loads are controlled in a wireless network by monitoring traffic patterns at an access point and determining that the access point is a high turnover access point. A high turnover access point is determined based on an average time devices spend in a coverage area of the access point being below a threshold level. Beacon and/or probe response messages are generated that identify the access point as a high turnover access point. In addition, a turnover activity value may be generated for the access point and included in the beacon and/or response messages. A mobile device may determine whether to authenticate and associate with the access point based on the turnover activity value.

13 Claims, 9 Drawing Sheets

(56) References Cited

U.S. PATENT DOCUMENTS

| | | | | |
|---|---|---|---|---|
| 2011/0249622 | A1* | 10/2011 | Takeda | H04W 48/20 370/328 |
| 2013/0170432 | A1* | 7/2013 | O'Brien | H04W 4/06 370/328 |
| 2013/0294227 | A1* | 11/2013 | Fukuzaki | G06F 11/2007 370/228 |
| 2013/0294270 | A1* | 11/2013 | Yang | H04W 48/16 370/252 |
| 2013/0308494 | A1 | 11/2013 | Shu et al. | |
| 2015/0085659 | A1* | 3/2015 | Hong | H04W 28/085 370/235 |
| 2016/0007386 | A1* | 1/2016 | Park | H04W 76/10 370/329 |
| 2016/0111004 | A1* | 4/2016 | Delmas | G08G 1/147 340/932.2 |

FOREIGN PATENT DOCUMENTS

| | | | | |
|---|---|---|---|---|
| CN | 104244274 A | | 12/2014 | |
| EP | 2999268 A1 | | 3/2016 | |
| WO | 2011/086097 A1 | * | 7/2011 | H04W 48/20 |
| WO | 2014124681 A1 | | 8/2014 | |

* cited by examiner

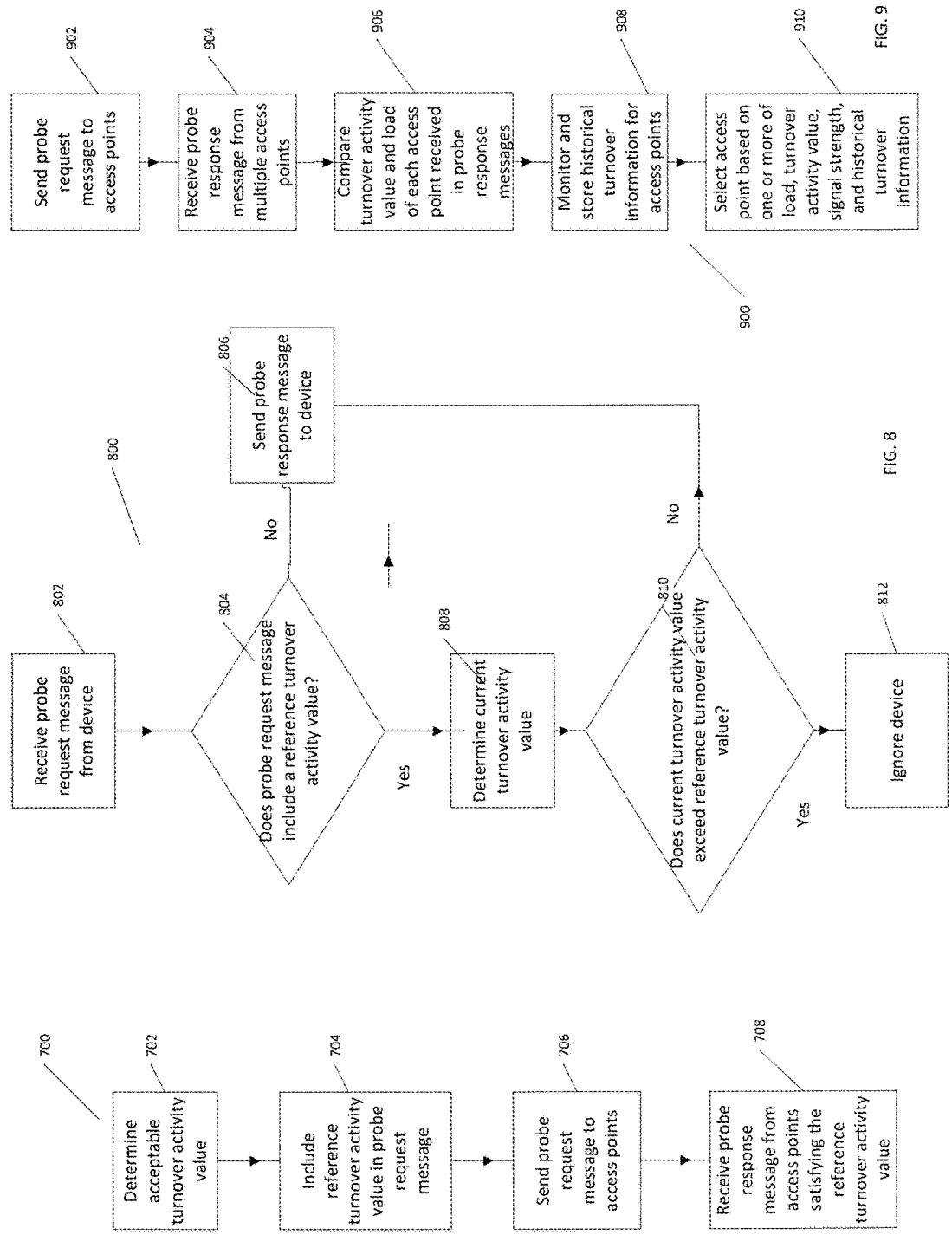

SYSTEM AND METHOD FOR CONTROLLING NETWORK SIGNALING LOADS IN A WIRELESS NETWORK

TECHNICAL FIELD

The present disclosure relates in general to wireless telecommunications and more particularly to a system and method for controlling network signaling loads in a wireless network.

BACKGROUND

In high traffic locations such as traffic lights, train stations, and corridors where people and devices are moving relatively fast in and out of wireless or Wi-Fi access point coverage for a network, devices may automatically connect to an access point upon entering its coverage area. Current standards allow devices to associate with an access point when in range of its coverage area and authenticate each time a device moves to a coverage area of a new access point. In many instances, devices are in range of an access point for only short time interval, too short to initiate data exchange. From the user's perspective, devices will continue to attempt authentication despite not being subscribed to the network and applications may be running on the device with 'keep alive' messages needing access to the network. As a result, an unnecessary drainage of the device battery occurs. From the network side, unwanted associations and authentications initiated by transient devices increase overhead, exhaust system resources, and affect legitimate associations competing for network bandwidth.

SUMMARY

From the foregoing, it may be appreciated by those skilled in the art that a need has arisen for reducing network signaling loads and increasing device operability in a wireless network. In accordance with the present disclosure a system and method are provided for controlling network signaling loads in a wireless network that greatly reduces and substantially eliminates the problems associated with conventional authentication signaling techniques.

In accordance with one embodiment, there is provided a method for controlling network signaling loads in a wireless network. The method includes monitoring traffic patterns at an access point, determining that the access point is a high turnover access point where a high turnover access point indicates that an average time devices spend in a coverage area of the access point is below a threshold level, and generating beacon and/or probe response messages identifying the access point as a high turnover access point.

In accordance with another embodiment, there is provided a non-transitory computer readable medium including code for controlling network signaling loads in a wireless network. The code is operable upon execution to monitor traffic patterns at an access point, determine that the access point is a high turnover access point where a high turnover access point indicates that an average time devices spend in a coverage area of the access point is below a threshold level, and generate beacon and/or probe response messages identifying the access point as a high turnover access point.

In accordance with yet another embodiment, there is provided a system for controlling network signaling loads in a wireless network. The system includes an access point operable to monitor traffic patterns. From the traffic patterns, the access point is operable to determine that it is a high turnover access point where a high turnover access point indicates that an average time devices spend in a coverage area of the access point is below a threshold level. The access point is operable to generate beacon and/or probe response messages identifying the access point as a high turnover access point.

The present disclosure describes many technical advantages over conventional authentication signaling techniques. For example, one technical advantage is to inform devices that an access point performs authentication signaling for a multitude of transient devices. Another technical advantage is to allow a device to choose a connection behavior for a high turnover access point. Other technical advantages may be readily apparent to and discernable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 7 illustrates an alternate process flow of actions taken by the device in the wireless network;

FIG. 8 illustrates a process flow of actions taken by the access point in the wireless network in response to actions by the device in FIG. 5;

FIG. 9 illustrates a process flow of actions taken by the device in the wireless network when receiving multiple probe response messages;

DETAILED DESCRIPTION

FIGS. 1 through 11, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system. Features shown and discussed in one figure may be implemented as appropriate in one or more other figures.

Figure 1:
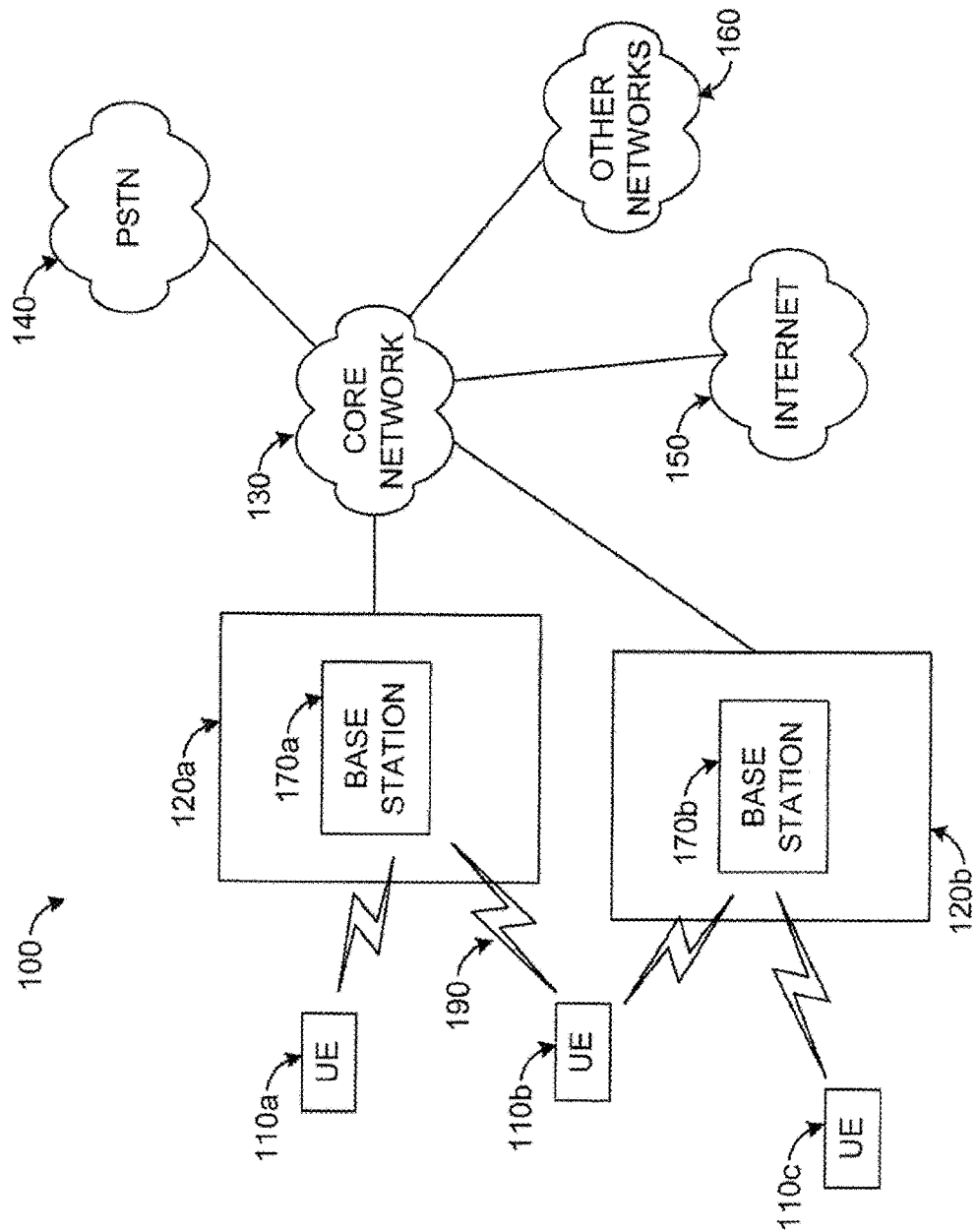
FIG. 1 illustrates an example communication system.
Figure 2:
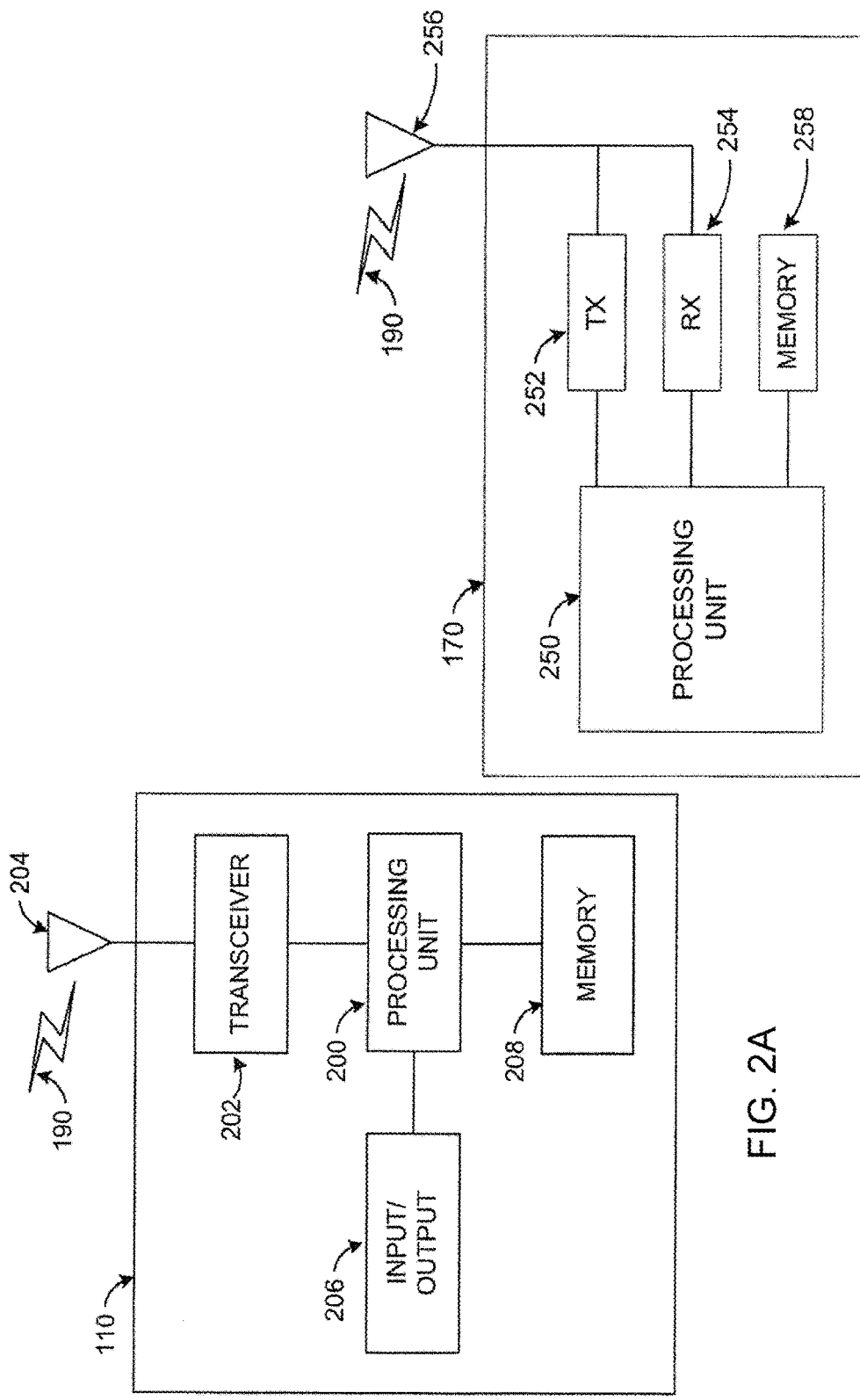
FIGS. 2A and 2B illustrate example devices that may be used in the communication system.

FIG. 1 illustrates an example communication system 100 that may be used for implementing the devices and methods disclosed herein. In general, the system 100 enables multiple wireless users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes user equipment (UE) 110a-110c, radio access networks (RANs) 120a-120b, a core network 130, a public switched telephone network (PSTN) 140, the Internet 150, and other networks 160. While certain numbers of these components or elements are shown in FIG. 1, any number of these components or elements may be included in the system 100.

The UEs 110a-110c are configured to operate and/or communicate in the system 100. For example, the UEs 110a-110c are configured to transmit and/or receive wireless signals. Each UE 110a-110c represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 120a-120b here include base stations (or access points) 170a-170b, respectively. Each base station 170a-170b is configured to wirelessly interface with one or more of the UEs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), a wireless router, a server, a switch, or any other suitable processing entity with a wired or wireless network.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the UEs 110a-110c over one or more air interfaces 190 using wireless communication links. The air interfaces 190 may utilize any suitable radio access technology.

It is contemplated that the system 100 may use multiple channel access functionality, including such schemes as described herein. In particular embodiments, the base stations 170a-170b and UEs 110a-110c are configured to implement LTE, LTE-A, and/or LTE-B.

The RANs 120a-120b are in communication with the core network 130 to provide the UEs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110a-110c may include functionality for communicating with different wireless networks over different wireless links using different wireless technologies and/or protocols.

Although FIG. 1 illustrates one example of a communication system, various changes may be made to FIG. 1. For example, the communication system 100 could include any number of UEs, base stations, networks, or other components in any suitable configuration.

FIGS. 2A and 2B illustrate example devices that may be used for implementing the methods and teachings disclosed herein. In particular, FIG. 2A illustrates an example UE 110 and FIG. 2B illustrates an example base station 170. These components could be used in the system 100 or in any other suitable system.

As shown in FIG. 2A, the UE 110 includes at least one processing unit 200. The processing unit 200 implements various processing operations of the UE 110. For example, the processing unit 200 could perform signal coding, data processing, power control, input/output processing, or any other functionality enabling the UE 110 to operate in the system 100. The processing unit 200 also supports the methods and teachings described in more detail below. For example, the processing unit 200 is configured to control or support operations of the UE 110 according to the D2D standards and principles described below. Each processing unit 200 includes any suitable processing or computing device configured to perform one or more operations. Each processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna 204. The transceiver 202 is also configured to demodulate data or other content received by the at least one antenna 204. Each transceiver 202 includes any suitable structure for generating signals for wireless transmission and/or processing signals received wirelessly. Each antenna 204 includes any suitable structure for transmitting and/or receiving wireless signals. One or multiple transceivers 202 could be used in the UE 110, and one or multiple antennas 204 could be used in the UE 110. Although shown as a single functional unit, a transceiver 202 could also be implemented using at least one transmitter and at least one separate receiver.

The UE 110 further includes one or more input/output devices 206. The input/output devices 206 facilitate interaction with a user. Each input/output device 206 includes any suitable structure for providing information to or receiving information from a user, such as a speaker, microphone, keypad, keyboard, display, or touch screen.

In addition, the UE 110 includes at least one memory 208. The memory 208 stores instructions and data used, generated, or collected by the UE 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, and at least one memory 258. The processing unit 250 implements various processing operations of the base station 170, such as signal coding, data processing, power control, input/output processing, or any other functionality. The processing unit 250 can also support the methods and teachings described in more detail below. For example, the processing unit 250 is configured to control or support operations of the base station 170 according to the network signaling standards and principles described below. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless transmission to one or more UEs or other devices. Each receiver 254 includes any suitable structure for processing signals received wirelessly from one or more UEs or other devices. Although shown as separate components, at least one transmitter 252 and at least one receiver 254 could be combined into a transceiver. Each antenna 256 includes any suitable structure for transmitting and/or receiving wireless signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s).

Additional details regarding UEs 110 and base stations 170 are known to those of skill in the art. As such, these details are omitted here for clarity.

Figure 3:
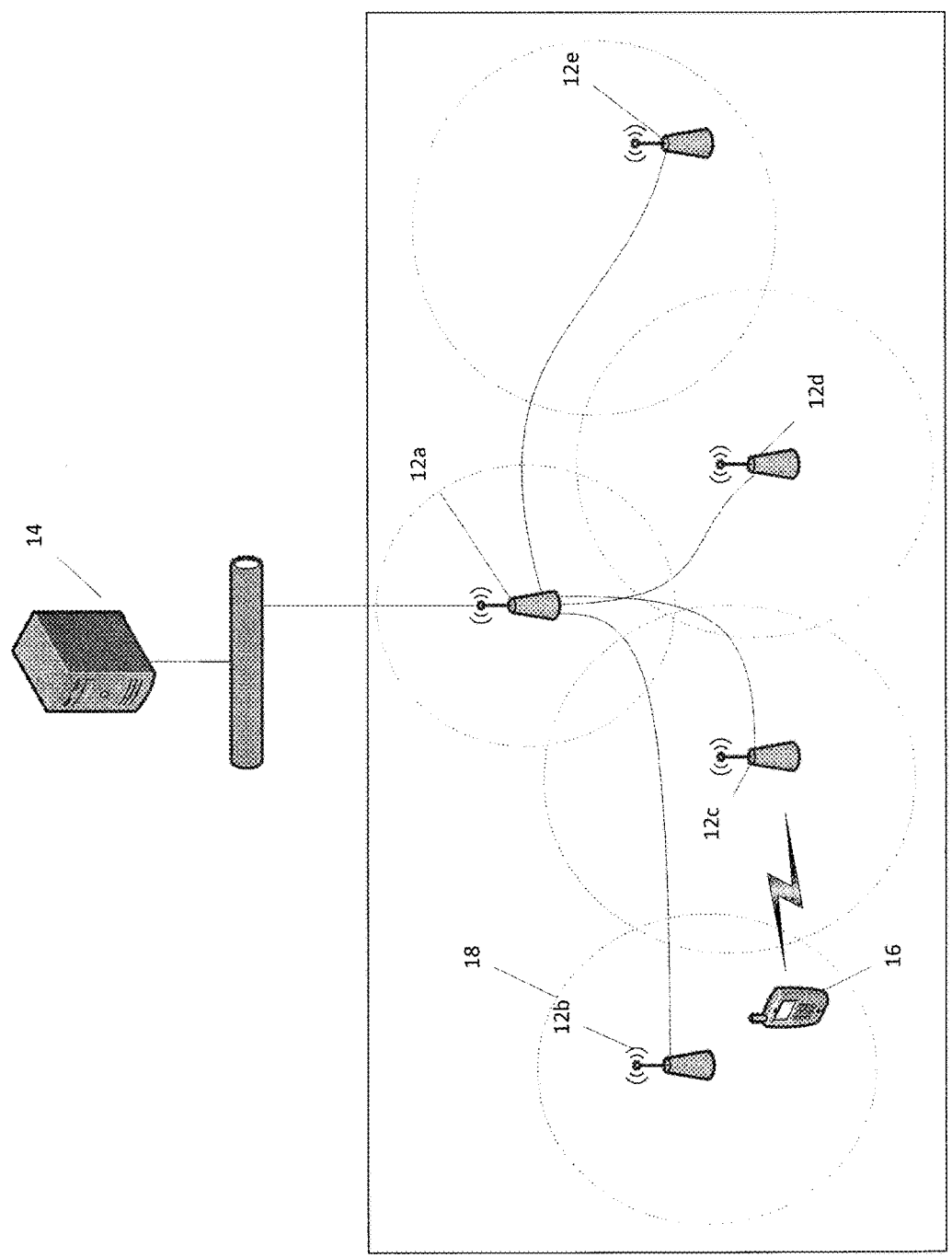
FIG. 3 illustrates an example wireless network.

FIG. 3 shows an example of a wireless network 10. Various components of wireless network 10 may represent (or be represented by) similar components of the system 100 of FIG. 1. Wireless network 10 includes a plurality of access points 12a-12e (or, collectively, access points 12) coupled to an authentication server 14 that provide communication capabilities for a device within range of wireless network 10, such as mobile device 16. An example of a server program that handles user requests for access to computer resources for an enterprise is an authentication/authorization/accounting (AAA) server. Each access point 12 has an area of coverage 18 in which operations take place. Wireless network 10 may be configured in a variety of ways. For example, access points 12 may communicate with authentication server 14 through a master access point 12a. Master access point 12a may have additional capabilities not found in the other access points 12. One or more of the other access points 12 may be a backup for master access point 12a in the event of its failure and may include the additional capabilities but are not active until a failure occurs in master access point 12a. As another example, each access point 12 may include the additional capabilities with the designation of master access point 12a being dynamically selected such that any access point may function as master access point 12a. In yet another example, there is no master access point 12a and each access point 12 is capable of communicating directly with authentication server 14 and with any other access point 12.

Figure 4:
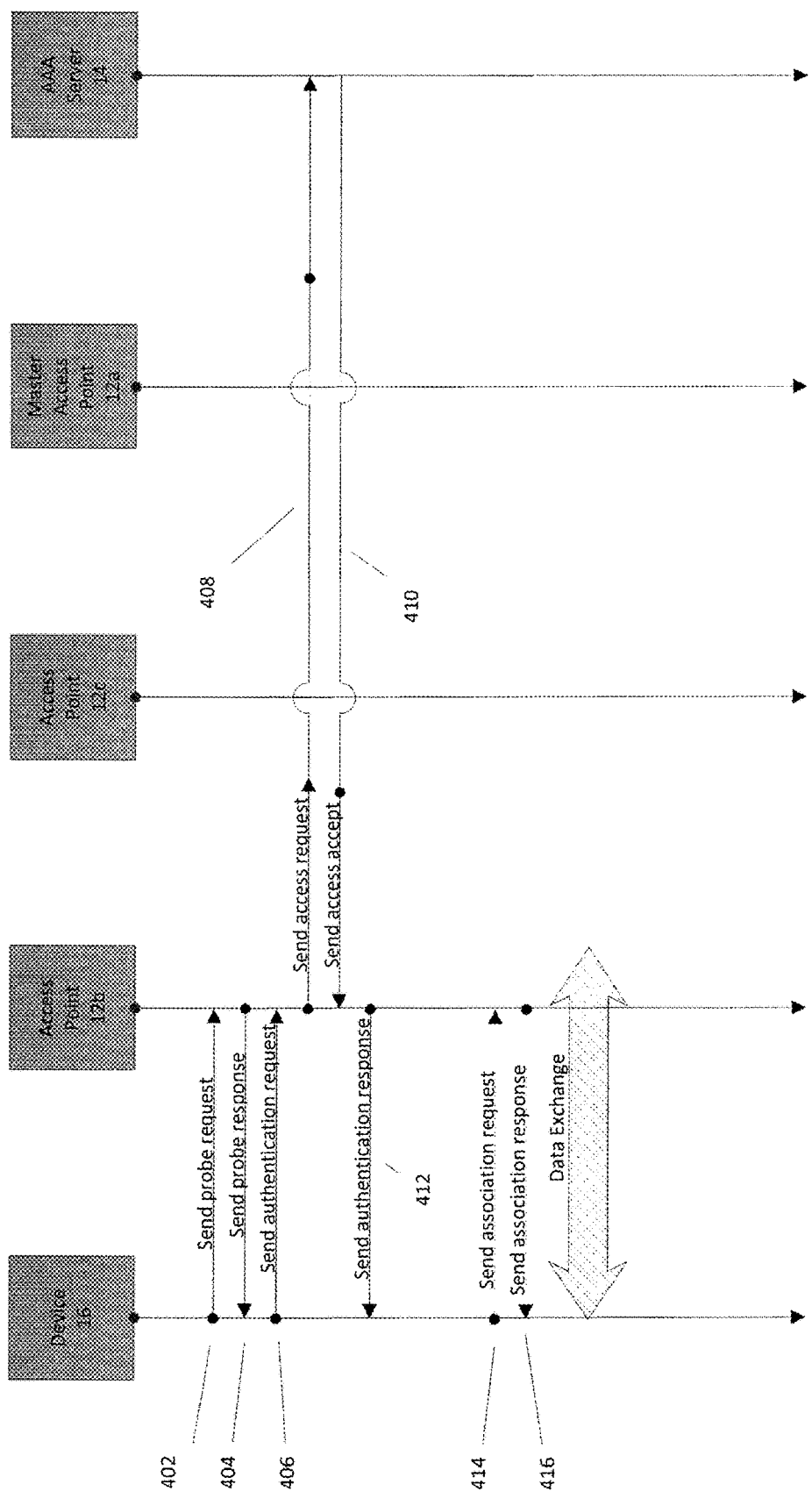
FIG. 4 illustrates an example operation of devices and access points in the wireless network.

FIG. 4 shows an example operation of devices 16 and access points 12 in a wireless network 10. In operation, device 16 first enters wireless network 10 within a range of a first wireless access point 12b. Device 16 may send a probe request message 402 to determine an access point 12 with which to communicate. In this case, access point 12b sends a probe response message 404 detected by device 16. Device 16 sends an authentication request message 406 to access point 12b. An access request message 408 is sent to authentication server 14 either directly or through master access point 12a depending on the configuration of wireless network 10. authentication server 14 returns an access accept message 410 (either directly or through master access point 12a) that is provided to access point 12b. The access accept message 410 indicates that device 16 has been authenticated in wireless network 10. Access point 12b sends an authentication response message 412 to device 16 informing device 16 that authentication has succeeded. If device 16 desires a data exchange through access point 12b, device 16 sends an association request message 414 to access point 12b. Access point 12b returns an association response message 416 to device 16 to allow device 16 to begin a data exchange. If device 16 is merely passing through the coverage area 18 of access point 12b, device 16 would not send an association request message 414 to access point 12b as device 16 does not desire a data exchange.

Figure 5:
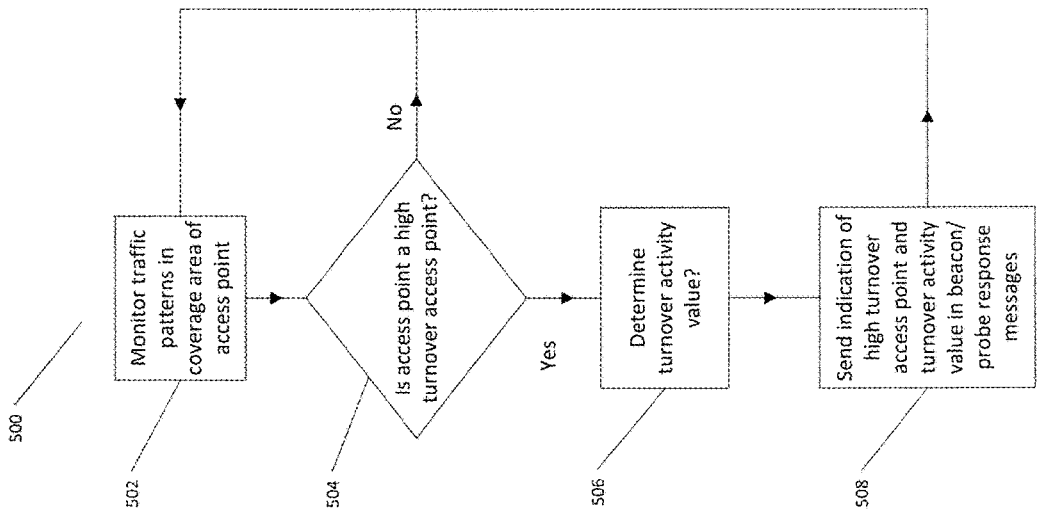
FIG. 5 illustrates a process flow of actions taken by an access point in the wireless network.

FIG. 5 shows a process flow 500 of actions taken by access point 12 in wireless network 10. In operation, access point 12 monitors traffic patterns within its area of coverage at block 502. Alternatively, monitoring may be implemented in a centralized manner, where access point 12 reports the distribution of time that devices spend in its coverage area to a central controller. A status for access point 12 is determined from the traffic patterns at block 504. Access point 12 may be given a status of high turnover access point according to various parameters. A high turnover access point may be defined as an access point that incurs many associations and disassociations for the same device within a short time period. A high turnover access point may be one that receives requests that time out for failure to process. The term may also be based on a percentage of users exhibiting these behaviors. Access point 12 may also declare itself a high turnover access point to allow devices to choose whether to connect, delay connection, or not connect. In addition, a high turnover access point may request a certain behavior from devices such as not connecting, delay authentication, and delay association. The status of a high turnover access point is not necessarily permanent and can be dynamically adjusted as desired. For example, such status may be based on the day or the time of day, enabled or disabled by a network operator, and changes in network resources.

Upon designation as a high turnover access point, access point 12 may determine a turnover activity value indicating a degree of turnover activity being encountered at block 506. The turnover activity value may take various forms, such as the mean residence times of devices in the coverage area of access point 12 and its standard deviation. Another example turnover activity value is a ratio between a standard deviation of the residence time and an average residence time of devices within the coverage area of access point 12. The turnover activity value may be a logical variable or a numeric variable ranging from no turnover, where this is no device mobility, to highest turnover, where devices associate and disassociate immediately. An indication of a high turnover access point and an accompanying turnover activity value may be broadcast in a beacon and/or probe response message by access point 12 in block 508.

Figure 6:
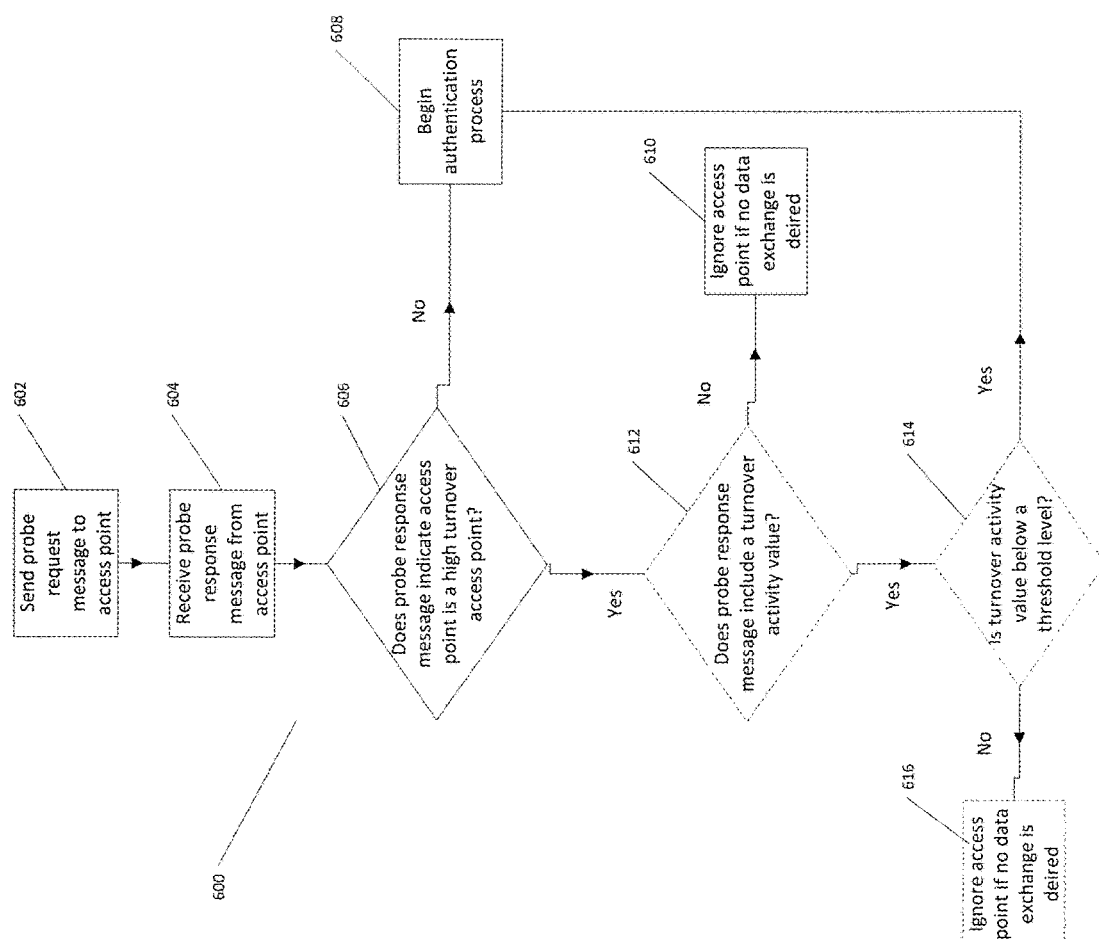
FIG. 6 illustrates a process flow of actions taken by a device in the wireless network.

FIG. 6 shows a process flow 600 of actions taken by device 16 in wireless network 10. Device 16 sends a probe request message to any listening access point 12 at block 602. Device 16 receives a probe response message from access point 12 at block 604. A check is made at block 606 as to whether the probe response message includes an indication that the access point 12 is a high turnover access point. If not, device 16 may initiate the authentication process at block 608. If a high turnover access point is indicated, device 16 may immediately ignore access point 12 if no data exchange is desired at block 610. No further signaling messages between device 16 and access point 12 occur over the air interface. Alternatively, device 16 checks for a turnover activity value in the probe response message at block 612. If none, device 16 may ignore access point 12 if no data exchange is desired at block 610. If a turnover activity value is present, device 16 compares at block 614 the turnover activity value to a threshold level.

If the turnover activity value is below the threshold level, device 16 will begin the authentication process at block 608. If the threshold level is reached or exceeded by the turnover activity value, device 16 may ignore access point 12 at block 616 if no data exchange is desired.

As a result, devices 16 may be given the decision making responsibility to authenticate and associate with access point 12. Such a decision may be determined by user set criteria or network policy. A mere indication of a high turnover access point may be sufficient for device 16 to decline authenticating and associating with access point 12. In another scenario, device 16 may authenticate and associate with a high turnover access point if the turnover activity value is below a certain threshold level. From the device perspective, limiting authentication signaling by excluding high turnover access points will preserve device battery power. From the access point perspective, lower traffic will be seen on the air interface and tracking of devices that choose not to connect is avoided.

FIG. 7 shows an alternate process flow 700 of actions taken by device 16 in wireless network 10. Device 16 may determine reference turnover activity value at block 702 prior to sending any probe request messages. Once determined, the reference turnover activity value is included in the probe request message at block 704 and device 16 transmits the probe request message at block 706. At block 708, device 16 receives probe response messages from one or more access points. A probe response message received by device 16 indicates that an access point 12 satisfies the criteria of the reference turnover activity value. Upon receiving probe response messages, device 16 may select an access point 12 with which to communicate and determine whether to authenticate and then associate with the selected access point 12.

FIG. 8 shows a process flow 800 of actions taken by access point 12 in wireless network 10 in response to actions by device 16 in FIG. 7. At block 802, access point 12 receives the probe request message from device 16. At block 804, access point 12 checks for a reference turnover activity value in the probe request message. If none is present, access point 12 transmits a probe response message to device 16 at block 806. If a reference turnover activity value is present in the probe request message, access point 12 determines a current turnover activity value at block 808. At block 810, a comparison is made between the reference turnover activity value and the current turnover activity value. If the current turnover activity value does not exceed the reference turnover activity value, access point 12 generates and transmits the probe response message at block 806. In this instance, access point 12 satisfies the communication criteria established by device 16. If the current turnover activity value exceeds the reference turnover activity value, access point 12 ignores device 16 at block 812. In this instance, the turnover characteristics of access point 12 are such that device 16 does not want to associate with access point 12. Access point 12 will not generate and send the probe response message, reducing the signaling over the air interface.

FIG. 9 shows a process flow 900 of actions taken by device 16 in wireless network 10 when receiving multiple probe response messages. At block 902, device 16 transmits a probe request message. If multiple access points 12 in range generate and send probe response messages, device 16 receives multiple probe response messages at block 904. Device 16 can choose which access point to associate with. The probe response messages may include the current turnover activity value and load at the respective access points 12. Device 16 compares turnover activity values and loads corresponding to the received probe response messages at block 906. Device 16 may also monitor and store historical turnover information associated with access points 12 at block 908. At block 910, device 16 may incorporate the historical turnover information in the selection process for an access point 12. Device 16 may choose an access point 12 based on a lowest turnover activity value, load at the access points, signal strength, historical turnover information, or various combinations of each.

Figure 10:
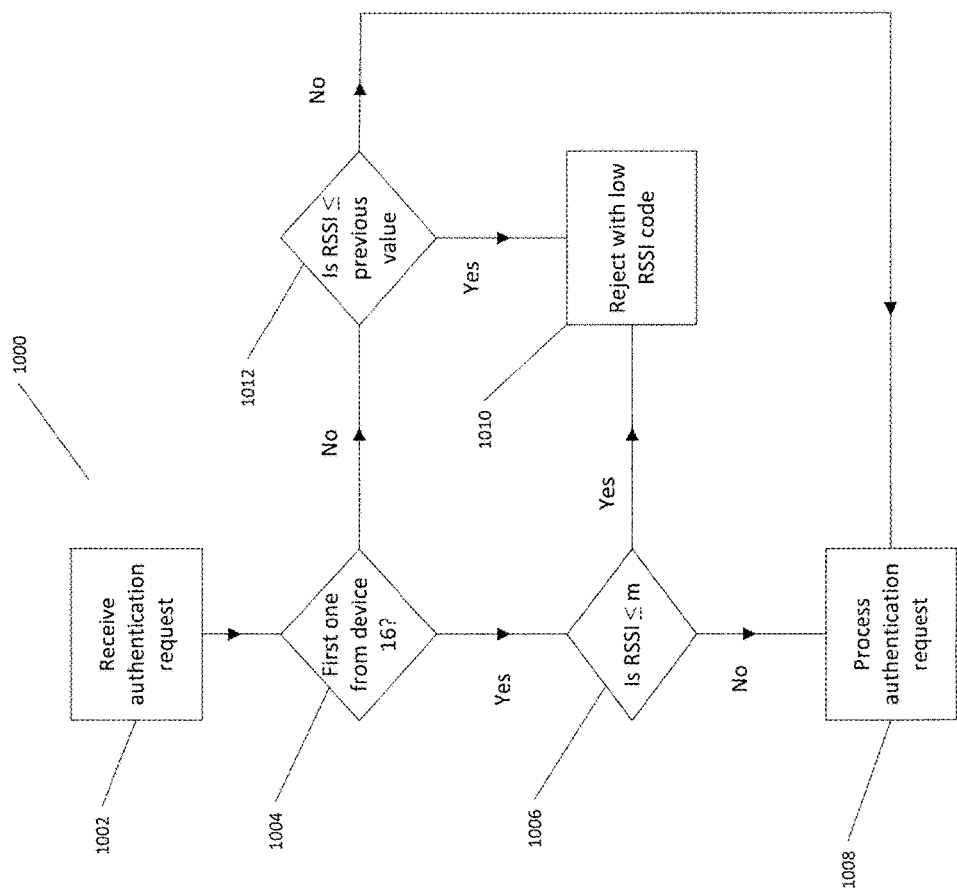
FIG. 10 illustrates a process flow of actions taken by the access point in limiting a number of authentication requests to process.

FIG. 10 shows a process flow 1000 to mitigate a problem of too many authentication requests being received from devices 16 in a very short time period. Access point 12 may limit or defer allowable authentication attempts in order to control which authentication requests to process. One way to limit allowable authentication attempts is to monitor a received signal strength indication (RSSI) of a device 16. As an authentication request is received at block 1002, access point 12 determines at block 1004 whether this is the first such request from device 16. If so, access point 12 determines the RSSI for device 16 and compares the RSSI to a reference level at block 1006. If the RSSI of device 16 exceeds the reference level, access point 12 processes the authentication request at block 1008. If the RSSI value of device 16 does not exceed the reference level, access point 12 rejects the authentication request at block 1010 and sends a low RSSI code to device 16. If, at block 1004, the authentication request received from device 16 is not its first such request sent, access point 12 determines a current RSSI of device 16 and compares the current RSSI to the previously determined RSSI at block 1012. If the current RSSI exceeds the previously determined RSSI, access point 12 processes the authentication request from device 16 at block 1008. If the current RSSI does not exceed the previously determined RSSI, access point 12 rejects the authentication request at block 1010 and sends a low RSSI code to device 16. In another embodiment, instead of being rejected, an authentication request may be given a low handling priority as compared to authentication requests satisfying the RSSI check. In such an embodiment, access point 12 may rely on a timeout procedure of device 16, where device 16 retransmits an authentication request upon not receiving an authentication response within a certain time period, in limiting processing of authentication requests. Using RSSI to limit or defer allowable authentication attempts is just one parameter for controlling the number of authentication requests to process. Other parameters such as random selection, total number of authentication requests being processed at any given time, device characteristics, and/or other network parameters, either alone or in combination, may be used in determining which authentication requests to process. Process flow 1000 may be readily adjusted to accommodate different parameters.

Figure 11:
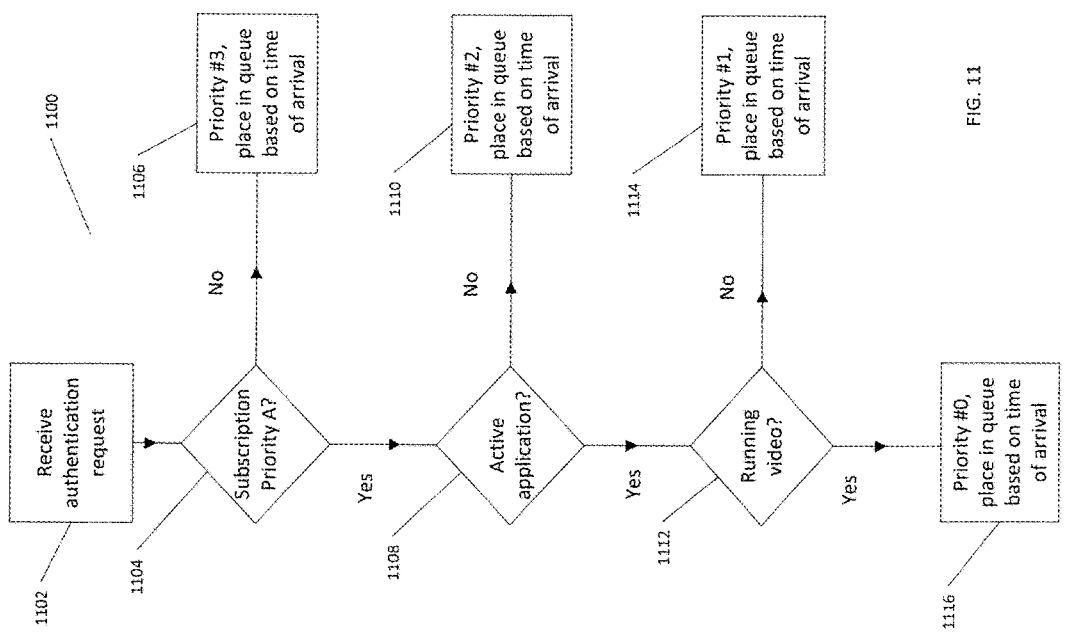
FIG. 11 illustrates a process flow of actions taken by the access point in prioritizing authentication requests to process.

FIG. 11 shows a process flow 1100 for handling multiple authentication requests once they have been accepted for processing. Multiple authentication requests are handled by storing authentication requests in a queue, prioritizing authentication requests in the queue, and processing authentication requests from the queue having the highest priority. Authentication handling may be differentiated based on a variety of parameters. In process flow 1100, authentication requests can be differentiated based on subscription type, active application, type of active application, or a combination of two or more of these. These parameters are merely used for discussion purposes as other parameters and levels of priorities may be utilized to adjust the sophistication of the prioritization scheme.

An authentication request is received at block 1102. A determination is made at block 1104 as to whether a subscription priority corresponds to the authentication request. If not, the authentication request is given the lowest priority at block 1106 and placed into the queue accordingly based on arrival time. If there is a subscription priority corresponding to the authentication request, a determination is made at block 1108 as to whether the authentication request also corresponds to an active application. If not, the authentication request is given a higher priority at block 1110 and placed into the queue accordingly based on its arrival time. If the authentication request does correspond to an active application, a determination is made at block 1112 as to whether the active application includes running video. If not, the authentication request is given the next higher priority at block 1114 and placed into the queue accordingly based on arrival time. If the active application does have running video, the authentication request is given the highest priority at block 1116 and placed into the queue accordingly based on arrival time.

As shown in process flow 1100, a first authentication request arriving at time t1 with a subscription priority A with an active application running video is placed at the top of the queue. A second authentication request arriving at time t1+x with a subscription priority A and an active application not running video is placed into the queue thereafter. A third authentication request with the parameters of the first authentication request would slot into the queue before the second authentication request (based on priority) and after the first authentication request (based on arrival time). Subsequent authentication requests would be placed into the queue according to the respective parameters. Authentication requests in handover situations will typically have an active application in operation. The authentication request indicates whether there is a corresponding active application and if running video is being processed. Once device 16 is authenticated, a corresponding subscriber priority is known. The subscriber priority is communicated from a source access point to a target access point in a handover situation.

In some embodiments, some or all of the functions or processes of the one or more of the devices and other hardware devices discussed above are implemented or supported by a computer program that is formed from computer readable program code and that is embodied in a computer readable medium and executed by a processor. The phrase "code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to and readily discernable by those skilled in the art. Accordingly, the above description of example embodiments does not define or constrain this disclosure. Other changes, substitutions, and alterations are also possible without departing from the scope of this disclosure as defined by the following claims.

What is claimed is:

1. A method for controlling network signaling loads in a wireless network, comprising:
    receiving, by an access point, a probe request from a device comprising a reference turnover activity value;
    generating, by the access point, a current turnover activity value based on a mean residence times of devices in a coverage area of the access point and a standard deviation of the devices in the coverage area of the access point, with the current turnover activity value indicating a degree of turnover activity;
    determining, by the access point, that-the current turnover activity value is less than the reference turnover activity value;
    sending, by the access point, a probe response to the device.

2. The method of claim 1, before sending the probe response, further comprising:
    monitoring, by the access point, traffic patterns at the access point;
    determining, by the access point, that the access point is a high turnover access point, the high turnover access point indicated by an average time that a plurality of devices spend in a coverage area of the access point being below a threshold level.

3. The method of claim 1, the probe response message identifies the access point as a high turnover access point.

4. The method of claim 1, further comprising: including the turnover activity value in the probe response message.

5. A method for controlling network signaling loads in a wireless network, comprising:
    receiving, by a device, a message from an access point, wherein the message comprises a turnover activity value for the access point, wherein the turnover activity value is based on a mean residence times of devices in a coverage area of the access point and a standard deviation of the devices in the coverage area of the access point, with the current turnover activity value indicating a degree of turnover activity;
    determining, by the device, that the turnover activity value is below a threshold level;
    sending, by the device in response to the determination that the turnover activity value is below a threshold level, an authenticating message to the access point.

6. The method of claim 5, wherein the receiving a beacon message or a probe response message from the access point comprises:
    receiving, by the device, multiple probe response messages from multiple access points.

7. The method of claim 6, after comparing the turnover activity value to the threshold level, further comprising:
    monitoring, by the device, historical turnover information associated with each of the multiple access points; and
    choosing, by the device, a lowest turnover access point with a lowest turnover activity value from the multiple access points which have turnover activity value bellowing the threshold level.

8. An access point, comprising:
- an interface that receives a probe request from a device, the probe request including a reference turnover activity value; and
- a processor that generates a current turnover activity value for the access point based on a mean residence times of devices in a coverage area of the access point and a standard deviation of the devices in the coverage area of the access point with the current turnover activity value indicating a degree of turnover activity, wherein the processor determines whether the current turnover activity value is less than the reference turnover activity value, and generates a probe response and the interface further sends the probe response to the device.

9. The access point of claim 8, wherein the processor, before sending the probe response, further monitors traffic patterns at the access point, determines that the access point is a high turnover access point, the high turnover access point indicated by an average time devices spend in a coverage area of the access point being below a threshold level.

10. The access point of claim 8, wherein the processor further includes the turnover activity value in the probe response message.

11. A device, comprising:
- an interface that receives a message from an access point, wherein the message comprises a turnover activity value for the access point, with the turnover activity value indicating a degree of turnover activity of the access point; and
- a processor that compares the turnover activity value to a threshold level and determines whether the turnover activity value is below the threshold level wherein the interface further sends an authenticating message to the access point in response to the determination that turnover activity value is below than the threshold level.

12. The device according to claim 11, wherein the interfaces receives multiple probe response messages from multiple access points.

13. The device according to claim 12, the processor, after comparing the turnover activity value to the threshold level, monitors historical turnover information associated with each access points, chooses one access point with a lowest turnover activity value, from the access points which have turnover activity value bellowing the threshold level.

* * * * *